(12) United States Patent
De Angelis

(10) Patent No.: US 9,395,894 B2
(45) Date of Patent: Jul. 19, 2016

(54) SYSTEM AND METHOD FOR BROWSER SIDE COLORIZING OF ICON IMAGES

(71) Applicant: Software AG, Darmstadt (DE)

(72) Inventor: Vittorio De Angelis, Schwalbach-Hülsweiler (DE)

(73) Assignee: Software AG, Darmstadt (DE)

( * ) Notice: Subject to any disclaimer, the term of this patent is extended or adjusted under 35 U.S.C. 154(b) by 206 days.

(21) Appl. No.: 14/072,994

(22) Filed: Nov. 6, 2013

(65) Prior Publication Data

US 2015/0128074 A1 May 7, 2015

(51) Int. Cl.
*G06F 3/0484* (2013.01)
*G06F 3/0481* (2013.01)
*G09G 5/06* (2006.01)
*G06F 5/06* (2006.01)

(52) U.S. Cl.
CPC ........ *G06F 3/04845* (2013.01); *G06F 3/04817* (2013.01); *G06F 5/06* (2013.01)

(58) Field of Classification Search
CPC ..................... G09G 5/06; H04N 1/644; G06F 3/048–3/04897
See application file for complete search history.

(56) References Cited

U.S. PATENT DOCUMENTS

| 8,791,954 B2* | 7/2014 | Engelbert et al. ............. 345/602 |
| 2002/0120092 A1* | 8/2002 | Kratschmer ........... C08G 64/06 528/196 |
| 2008/0184139 A1* | 7/2008 | Stewart et al. ................ 715/762 |
| 2011/0007087 A1* | 1/2011 | Ivanich .................... H04N 5/91 345/589 |
| 2012/0075328 A1* | 3/2012 | Goossens ....................... 345/592 |
| 2013/0036193 A1* | 2/2013 | Padmanabhan ............... 709/217 |
| 2014/0068522 A1* | 3/2014 | Lim et al. ...................... 715/846 |
| 2014/0362104 A1* | 12/2014 | Hitchcock ............... G09G 5/06 345/593 |
| 2015/0161082 A1* | 6/2015 | Levien et al. ......... G06F 17/214 |

OTHER PUBLICATIONS

Wees, Chance. "OldSkool Palette Sprites Tutorial." YouTube. YouTube, May 22, 2013. Web. Oct. 29, 2015. <https://www.youtube.com/watch?v=KvIGGaKGFJU>.*
Zakas, Nicholas. "Data URIs Make CSS Sprites Obsolete—NCZOnline." Data URIs Make CSS Sprites Obsolete—NCZOnline. NCZOnline, Jul. 6, 2010. Web. Mar. 10, 2016. <https://www.nczonline.net/blog/2010/07/06/data-uris-make-css-sprites-obsolete/>.*

(Continued)

*Primary Examiner* — Jennifer To
*Assistant Examiner* — Liang Li
(74) *Attorney, Agent, or Firm* — Posz Law Group, PLC

(57) ABSTRACT

A computer system and computer-implemented method colorizes a UI component image on the browser side. A data provider in the system encodes the UI component image into a Base64 character sequence which includes a header part and an image data part; generates Base64 header parts for specified colored versions of the UI component image; and transfers the encoded UI component image and the Base64 header parts for the specified colored versions of the UI component image to a client icon composer. The header part has a fixed amount of characters and the image data part has a variable amount of characters. The client icon composer replaces the header parts of the encoded UI component image with the Base64 header parts for the specified colored versions of the UI component image; and transfers the specified colored versions of the UI component image to a web page/application.

21 Claims, 9 Drawing Sheets

(56) References Cited

OTHER PUBLICATIONS

Zubach, Vasiliy. "Base64 vs. CSS Sprites: Battle for Performance." Tjrus. N.p., Jul. 15, 2012. Web. Mar. 10, 2016. <http://tjrus.com/blog/base64-vs-css-sprites-battle-for-performance>.*

Software AG . *Software AG Process Live*. [Online] Software AG, (Aug. 28, 2013). <http://www.softwareag.com/special/processlive/>.

http:/www.w3schools.com. [Online] W3Schools, (Aug. 28, 2013). <http://www.w3schools.com/css/css_image_sprites.asp>.

Lucidchart. Lucidchart Diagramming Software. [Online] (printed May 11, 2013) <http://www.lucidchart.com/>.

http://www.w3.org/. [Online] W3C CSS Masking Module Level 1, W3C Last Call Working Draft, Oct. 29, 2013, (Aug. 28, 2013). <http://www.w3.org/TR/css-masking>.

HTML5. *W3C*. [Online] W3C Working Draft Jan. 13, 2011, (Aug. 28, 2013). <http://www.w3.org/TR/2011/WD-html5-20110113//>.

Indexed PNG. *W3C*. [Online] W3C Portable Network Graphics (PNG) Specification (Second Edition). W3C Recommendation Nov. 10, 2003, (Aug. 28, 2013). <http://www.w3.org/TR/PNG/>.

PNG tRNS Transparency, *W3C*. [Online] (Aug. 28, 2013). <http://www.w3.org/TR/PNG/#11tRNS>.

jQuery [Online], (Aug. 28, 2013). <http://jquery.com/>.

* cited by examiner

SYSTEM AND METHOD FOR BROWSER SIDE COLORIZING OF ICON IMAGES

TECHNICAL FIELD

The technical field relates in general to user interfaces, and more specifically to controlling the colorizing of user interface (UI) components.

BACKGROUND

Corporations and other types of organizations utilize adaptable software to document and analyze their internal processes and organizational structure. Products such as the ARIS Connect Web Platform (an HTML/JavaScript based tool) provide a set of Rich Internet Applications (RIAs), which allow users to browse, read, create, and write their business processes using a web browser.

Software developers are able to provide the best user experience by adhering to common rules, principles, and patterns for modern web interfaces. One key principle of such development is the "Feedback Principle" which enables the system, including every UI component, to react in a manner that clearly communicates to the user what is the result of the user's action and what is the current state of the system and/or UI component.

A simple example of the implementation of the Feedback Principle is the use of a control button. For a simple control button, it is necessary to distinguish the following states: (1) Active (the button can be pressed); (2) Disable (the button cannot be pressed); (3) Hovered (the button is the target of the user's pointer); and (4) Pressed (the button has been pressed). Similar to many other components in modern web interfaces, buttons are often integrated seamlessly into the UI and only represented by a small icon/pictogram that illustrates the action related to the button. In such a case, it is important that the icon is an integral part of the component's feedback and clearly reflects the states described above.

Accordingly, many UI controls, elements, and artifacts utilize changes in color to provide clear, essential, and varied feedback to users. For example, the background gradient of a panel can be changed from a gray gradient to a red gradient to indicate an error within the related content. A small balloon beside a label or the user's picture (such as an avatar) can indicate new notifications or the online status of a web community buddy. User defined colored folders within a tree control can allow the users to structure their content in a better, more personalized manner. Colorizing background textures or other elements of a web page in accordance with the current time, weather, or state of process (such as at run time) can facilitate new ways to develop responsive web design.

While changing the color of the icon or graphical element displayed on the UI or web page is a common method for providing system feedback for the different states of UI components, there are many disadvantageous associated with traditional icon colorization approaches, including image sprites, icon fonts, CSS image masks, and browser side rendering with HTML5 Canvas.

SUMMARY

Accordingly, one or more embodiments provide a computer system. The computer system includes an i/o interface operable to transmit and receive communications over at least a portion of a communication network; and a processor. The processor is configured to facilitate: storing user interface (UI) component images; generating UI component images by reading the UI component images from server storage, transforming the UI component images into a color indexed image format, and storing the transformed UI component images back into the server storage; sending from a web page/application a request for the UI component image and a request for specified colored versions of the UI component image; receiving from the web page/application the request for the UI component image and the request for specified colored versions of the UI component image; sending the request for the UI component image and the request for specified colored versions of the UI component image; and providing data by: receiving from a client icon composer the request for the UI component image and the request for specified colored versions of the UI component image; reading the UI component image from the server storage; encoding the UI component image into a Base64 character sequence which includes a header part and an image part; generating Base64 header parts for the specified colored versions of the UI component image; and transferring the encoded UI component image and the Base64 header parts for the specified colored versions of the UI component image to the client icon composer. The header part can a fixed amount of characters and the image data part can have a variable amount of characters. The client icon composer receives the encoded UI component image and the Base64 header parts for the specified colored versions of the UI component image; replaces the header part of the encoded UI component image with the Base64 header parts for the specified colored versions of the UI component image; and transfers the specified colored versions of the UI component image to the web page/application.

According to another embodiment, all files generated by the computer system have color and transparency palettes of the same length.

According to yet another embodiment, all Base64 header parts have the same character length.

Yet another embodiment includes the replacement of a Base64 header part with a different Base64 header part to create a different colored UI component image.

According to another embodiment, a multi-colored UI component can be colorized.

In a further embodiment, a monochrome UI component can be colorized.

Still another embodiment includes a header part that contains color information and alpha information of the encoded UI component image. The color information is the same character length for all encoded images generated by the computer system. Similarly, the alpha information is the same character length for all encoded images generated by the computer system.

In a further embodiment, the client icon composer sends the request for the UI component image and the request for the specified colored versions of the UI component image using HyperText Transfer Protocol.

In still a further embodiment, if the data provider is unable to locate the requested UI component image in the server storage, the data provider instructs the image generator to generate a corresponding UI component image.

A further embodiment is a computer-implemented method for the browser side colorizing of a UI component image, according to one or more of the above embodiments.

Still another embodiment is a computer system for the browser side colorizing of a UI component image, wherein the Base64 header parts are generated on the browser side.

Yet another embodiment is a computer-implemented method for the browser side colorizing of a UI component image, wherein the Base64 header parts are generated on the browser side.

An embodiment provides a system and/or a method for browser side colorizing of a UI component image. The embodiment provides, by a processor, a base64-encoded image string having a header part and an encoded image; the header part contains a color palette for a user interface (UI) component; and the encoded image is image data for the UI component, in a color indexed image format which indexes colors into the color palette in the header part. The embodiment provides, by the processor, for the header part, plural different color palettes corresponding respectively to plural different colored versions of the UI component. The embodiment controls, by the processor, the color of the UI component by switching content of the color palette in the header part of the base64-encoded image string to one of the plural different color palettes which corresponds to a different colored version of the UI component.

In another embodiment, each of the plural different color palettes corresponds to a different state of the UI component, and the controlling of the content of the color palette in the header part is performed responsive to a change in current state of the UI component.

In still another embodiment, the UI component is an icon.

In yet another embodiment, the plural different color palettes corresponding to the plural different colored versions of the UI component are stored in a base64-encoded format.

In still another embodiment, the color palette of the header part is configured to include a transparency palette with a gradient monochrome color scheme.

In yet another embodiment, the switching of the color palette in the header part of the base64-encoded image string is performed while the UI component is displayed, causing the UI component which is being displayed to change to the different colored version of the UI component.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
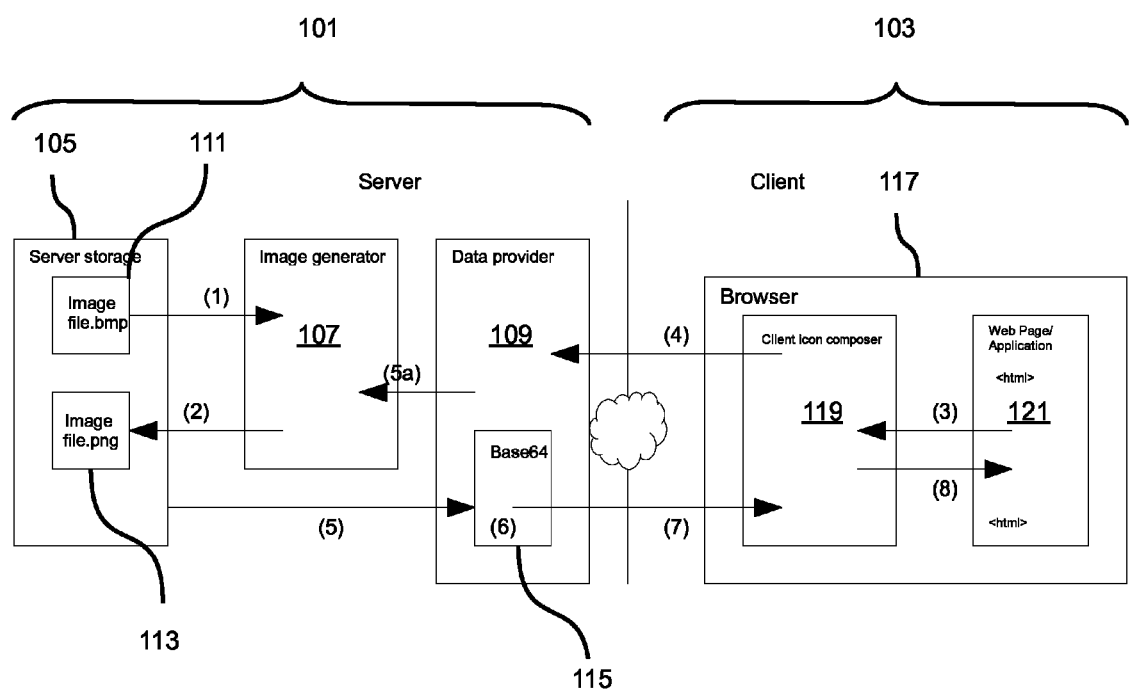
FIG. 1 is a data flow diagram illustrating a summary of several embodiments of a system and method for browser side colorization of an icon image.

In overview, the present disclosure concerns user interfaces, in which the appearance of a UI component can be altered according to different states of the UI component, so as to communicate, to the user, the state of the UI component via the color-coded appearance of the UI component; a simple and efficient approach is disclosed in which the image string has a modified header section containing a color palette that is switched according to the state of the UI component. Appropriate palette headers are produced, for example, on a server side, in which the palette headers correspond to the different states; the header section with the palette is switched on the client side to match the current states of the UI component. More particularly, various inventive concepts and principles are embodied in systems, devices, and methods therein in which a color-based appearance indicative of different states of a UI component is controlled by a replaceable color palette in a palette header section in the header of the image string and by generating different palettes for placement into the palette header section, in which each of the different palettes correspond to respective different states of the UI component. The different palettes can be generated prior to use of the UI component.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

<Definitions>

The claims may use the following terms, which are defined to have the following meanings for the purpose of the claims herein. Other definitions may be specified in this document.

The term "computer system" or "computer" used herein denotes a device sometimes referred to as a computer, laptop, personal computer, personal digital assistant, notebook computer, personal assignment pad, server, client, mainframe computer, or evolutions and equivalents thereof.

The term "Rich Internet Applications (RIA)" is used herein to denote Web-based applications that function as traditional desktop applications however Web browsers (or clients) are required for access. Unlike traditional applications, software installation is not required for use. However, some RIAs require that ActiveX, Java, Flash, or other similar technologies be installed on the user's computer.

The term "user interface (UI)" is used herein to denote a junction between a user and a computer program.

The term "graphical user interface (GUI)" is used herein to denote a junction between a user and a computer program that utilizes graphical indications such as windows, icons and pop-up menus, and pointing devices, among other graphical tools.

The term "HyperText Transfer Protocol (HTTP)" is used herein to denote a request-response protocol in a client-server computing model, in which a web browser executing on a client can request information from the server, sometimes referred to as an "application server." HTTP defines how messages are formatted and transmitted and what actions Web servers and browsers should take in response to various commands.

The term "colorize an icon image" is used herein to denote a change in the color of an icon image.

The term "icon image" is used herein to denote a picture, typically having a small size, typically being a stylized picture, which represents an object or program. Icons can be a primary feature of graphical user interfaces that assists a user interact with a computer system.

The term "palette" is used herein to denote a set of colors available for displaying simultaneously on a particular image.

The term "runtime" is used herein to denote something that occurs while a program to which the occurrence is related is executing.

<End of Definitions>

In overview, one or more embodiments can, among other things, efficiently colorize an icon image on the browser side of a computer system. In one or more of these embodiments, monochromatic and/or multi-colored icon images can be colorized at runtime.

As further discussed herein below, various inventive principles and combinations thereof are advantageously employed to efficiently facilitate the browser side colorization of icon images.

Conveniently, modern and traditional browsers can be supported by one or more embodiments. For example, Microsoft Internet Explorer 8 is one of many browsers that can be supported by an embodiment. According to one or more embodiments, the icon image can be colorized in a highly efficient manner. Moreover, the transferred data can be small. In accordance with one or more embodiments, a multi-colored icon can be colorized. Also, no information of the icon image is lost during the transfer. Additionally, the icon image can be colorized at runtime.

It is a strong advantage to facilitate colorization of an icon image that is associated with an application at runtime of the application, and while the application is running, to replace the original color of an icon with any color provided by the user or an external part of the system, especially to indicate a change in state of the icon, for example where the application is a web browser and where the icon is a UI component of the web browser. Such a system can be used on a wide range of browsers, including not only older non HTML5 browsers such as, for example, Microsoft Internet Explorer 7 or 8, but also modern variants and extensions thereof.

Further in accordance with exemplary embodiments, there is provided a method and system that provides an icon image in a specially generated color palette based image format, which is transferred as a Base64 encoded character sequence to the client browser. The specially generated color palette based image format and the resulting Base64 character sequence can be used to display and colorize icon images of the same size in a universal and highly efficient manner on the client browser.

Referring now to FIG. 1, a data flow diagram illustrating a summary of several embodiments of a system and method for browser side colorization of an icon image will be discussed and described. This diagram illustrates the components and how these components interact to display a color replaceable icon. The components can be on the server side 101 or the client side 103. In the following sections, an icon is discussed as a concrete example of a user interface component, however, colorization of other user interface components can be controlled as discussed herein.

The system components on the server side 101 include a server storage 105, an image generator 107 component, and a data provider 109 component. The server storage includes icon image files in one or more formats, for example as one or more .bmp files and/or .png files, represented here by image file.bmp 111 and image file.png 113. The data provider 109 component includes a Base64 encoder 115. The image generator 107 component transforms one or more icons into a special color indexed image format. The transformation of the icon images by the image generator can be done in advance of executing the application associated with the icon, or at runtime of the application that is associated with the icon. The data provider 109 component delivers requested image icons and image file headers to the client. The data provider 109 component is responsible for the creation of the Base64 strings and the replaceable Base 64 header strings. If requested, the data provider 109 component can use the image generator 107 component to generate color replaceable indexed color images on demand.

The system components on the client side 103 include the browser 117. The browser 117 includes the client icon composer 119 and the web page/application 121. The client icon composer 119 requests icon images and image file headers from the data provider 109 and puts them together on the client side to replace the icon color.

Still referring to FIG. 1, the interaction between the components is discussed. At flows 1 and 2, the image generator 107 component is used in advance of running the web page/application 121 to transform the image icons in a color indexed and color replaceable format, as will be described in greater detail herein. At read flow 1, the image generator 107 component reads one of the image files from the server storage 105. At storage flow 2, the image generator 107 component stores the generated image file back in the server storage 105. Conventional techniques may be used to read and/or store image files.

At flow 3 in FIG. 1, the web page/application 121 requests a color replaceable icon image from the client icon composer 119. The web page/application 121 also requests that the client icon composer 119 define all specified or required colored versions of the color replaceable icon image. As depicted at flow 4, the client icon composer 119 requests the color replaceable icon, for example, sending a request for a file via known HTTP techniques, from the data provider 109 on the server side 101.

At flow 5, the data provider 109 reads the corresponding file which corresponds to the color replaceable icon image from the server storage 105. Known techniques may be used to read the file. If the corresponding file does not exist, then the data provider 109 component can use the image generator 107 component to generate a corresponding image on demand, as shown at flow 5a.

Flow 6 represents the data provider 109 using the Base64 encoder 115 to encode the image into a Base64 character sequence and generate all Base64 headers for the requested colors for the header replacement for the file. In this embodiment, the header generation occurs on the server side 101.

At flow 7, the data provider 109 component transfers the Base64 data back, using known techniques, to the client 103 via the icon client composer 119. The icon client composer creates colored versions of the icon image and at flow 8 delivers these colored versions of the icon image to the web page/application.

Figure 2:
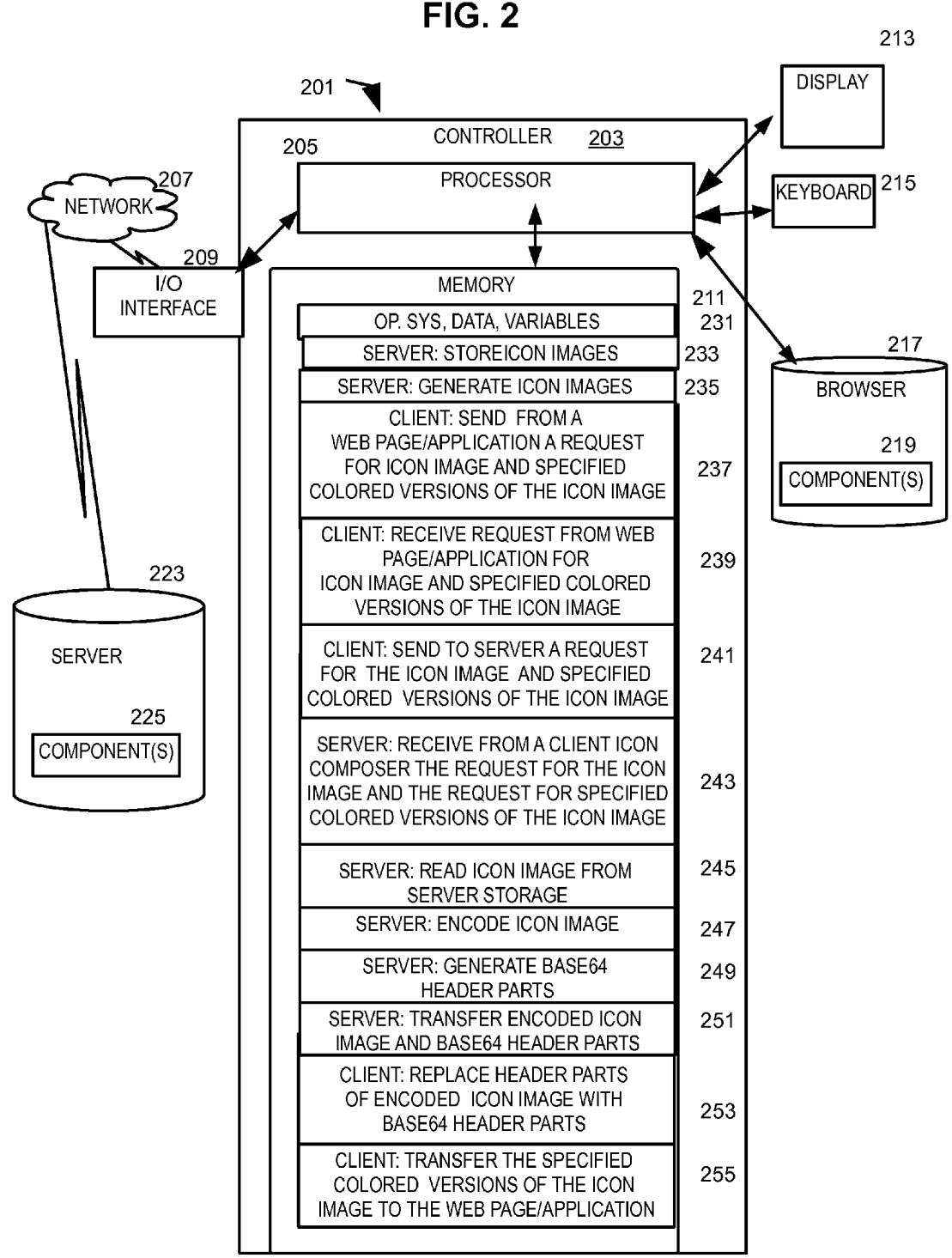
FIG. 2 is a block diagram illustrating relevant portions of a computer system.

Referring now to FIG. 2, a block diagram illustrating relevant portions of a computer system 201 will be discussed and described. The computer system 201 may include one or more controllers 203, a processor 205, an input/output (i/o) interface 209 for communication such as with a network 207, a memory 211, a display 213 (optional), and/or a user input device such as a keyboard 215. Alternatively, or in addition to the keyboard 215, a user input device may comprise one or more of various known input devices, such as a keypad, a computer mouse, a touchpad, a touch screen, a trackball, and/or a keyboard. The display 213 may present information to the user by way of a conventional liquid crystal display (LCD) or other visual display, and/or by way of a conventional audible device (e.g., a speaker) for playing out audible messages. Portions of the computer system 201 are well understood to those of skill in this area and have been omitted to avoid obscuring the discussion.

The processor 205 may comprise one or more microprocessors and/or one or more digital signal processors. The memory 211 may be coupled to the processor 205 and may comprise a read-only memory (ROM), a random-access memory (RAM), a programmable ROM (PROM), and/or an electrically erasable read-only memory (EEPROM). The memory 211 may include multiple memory locations for storing, among other things, an operating system, data and variables 231 for programs executed by the processor 205; computer programs for causing the processor to operate in connection with various functions such as storing 233 icon images on the server side; generating 235 icon images on the server side; sending 237 from the client side web page/application a request for an icon image and specified colored versions of the icon image; receiving 239 on the client side a request for an icon image and specified colored versions of the icon image; sending 241 from the client side the request for the icon image and specified colored versions of the icon image; receiving 243 on the server side from a client icon composer the request for the icon image and the request for specified colored versions of the icon image; reading 245 on the server side the icon image file from the server storage; encoding 247 on the server side the icon image; generating 249 on the server side Base64 header parts; transferring 251 from the server side the encoded icon image and Base64 header parts; replacing 253 on the client side header parts of the encoded icon image with Base64 header parts; and transferring 255 from the client side the specified colored versions of the icon image to the web page/application on the client side. These functions are discussed in more detail below. The computer programs may be stored, for example, in ROM or PROM and may direct the processor 205 in controlling the operation of the computer 201. Each of these functions is considered in more detail herein, to the extent that it is not detailed elsewhere in this document.

The user may invoke functions accessible through the user input device such as the keyboard 215. The user input device may comprise one or more of various known input devices, such as a keyboard (215, illustrated) and/or a pointing device, such as a mouse; the keyboard 215 may be supplemented or replaced with a scanner, card reader, or other data input device; and the pointing device may be a mouse, touch pad control device, track ball device, or any other type of pointing device.

Responsive to manual signaling from the user input device represented by the keyboard 215, in accordance with instructions stored in memory 211, and/or automatically upon receipt of certain information via the i/o interface 209, the processor 205 may direct the execution of the stored programs.

The computer 201 utilizes a browser 217, which includes of several browser component(s) 219 (such as the client icon composer 119 and the web page/application 121 discussed in connection with FIG. 1).

The computer 201 can access a server 223 on which is stored one or more components (such as the server storage 105, image generator 107, and the data provider 109 discussed in connection with FIG. 1), here represented by server component(s) 225. Although the components 225 are illustrated as accessed over the network 207, the components 225 may be remotely and/or locally accessible from the computer 201, over a wired and/or wireless connection; the components 225 do not need to be limited to a database or a server. Techniques are known for accessing components located in a server 223, and the like.

With regard to the server 223 and browser 217, it may be noted that the computer programs stored in the memory 211 are illustrated on the controller 203. In a client/server embodiment such as illustrated in FIG. 1, one or more of the computer programs conveniently may be distributed to the server, such as those marked "SERVER", and one or more of the computer programs conveniently may be distributed to a client side, such as those marked "CLIENT". In such a situation, the server 223 may omit the client computer programs, and the client may omit the server computer programs. In another embodiment, the computer programs may be included on a non-client-server architecture, and the requests between client-server may be omitted.

The processor 205 may be programmed 233 for storing icon images. Images are stored in the server storage. Techniques are known for storing icon images. The images can be stored in one or more formats.

The processor 205 may be programmed 235 for generating icon images. These image icons can be read from storage by the image generator, transformed into color indexed format and color replaceable formats as discussed elsewhere herein, and then returned to the server storage.

The processor 205 may be programmed for sending, from the web page/application, a request for an icon image and specified colored versions of the icon image 237. The web page or application requests a color replaceable icon from the client icon composer to define all required colored versions of the icon image. The request is transferred from the web page/application on the client side to the client icon composer on the client side.

The processor 205 may be programmed 239 for receiving, from the web page/application, a request for an icon image and specified colored versions of the icon image. The request from the web page/application is received by the client icon composer on the client side.

The processor 205 may be programmed 241 for sending, from the client-side, the request for the icon image and specified colored versions of the icon image. The client icon composer on the client side sends the request to the data provider on the server side.

The processor 205 may be programmed 243 for receiving, on the server side, from a client icon composer, the request for the icon image and the request for specified colored versions of the icon image. The data provider receives the request from the client icon composer.

The processor 205 may be programmed 245 for reading the icon image file from the server storage. The icon image file that has been requested by the web page/application is retrieved on the server side from the server storage.

The processor 205 may be programmed 247 for encoding the icon image. The icon image, which is retrieved, is encoded into a Base64 character sequence on the server side.

The processor 205 may be programmed 249 for generating Base64 header parts. All Base64 headers for the requested color(s) of the color replaceable icon image are generated. The header generation process can occur on the server side or the client server. On the server side, the header generation can occur in the data provider. On the client side, the header generation can occur in the client icon composer.

The processor 205 may be programmed 251 for transferring the encoded icon image and Base64 header parts. The data provider transfers the encoded icon image and the Base64 header parts from the server side to the client side, specifically to the client icon composer. If the Base64 headers have been generated in the data provider then the Base64 headers are part of this transfer process. However, if the Base64 headers are generated in the client icon composer on the client side, then the Base64 headers are not part of this transfer process.

The processor 205 may be programmed 253 for replacing header parts of the encoded icon image with Base64 header parts. The icon client composer creates the requested colored versions of the icon image by replacing the header parts. This browser side colorizing of the icon image can occur because the icon image has been encoded with colorizing information that is interchangeable.

The processor 205 may be programmed 255 for transferring the specified colored versions of the icon image to the web page/application. This transfer occurs on the client side. The client icon composer sends the colorized icon image to the web page/application.

As will be understood in this field, besides the functions discussed above, the memory 211 can include other miscellaneous information in a misc. database, not shown, along with the usual temporary storage and other instructions for other programs not considered herein.

The computer 201 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 205, memory 211, a disk drive and/or removable storage medium are referred to as "computer-readable storage media" and provide non-transitory storage of computer programs and data.

It should be understood that FIG. 2 is described in connection with logical groupings of functions or resources. One or more of these logical groupings may be performed by different components from one or more embodiments. For example, the functionality of generating 249 Base64 header parts can be performed on the server side or on the browser side. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 3:
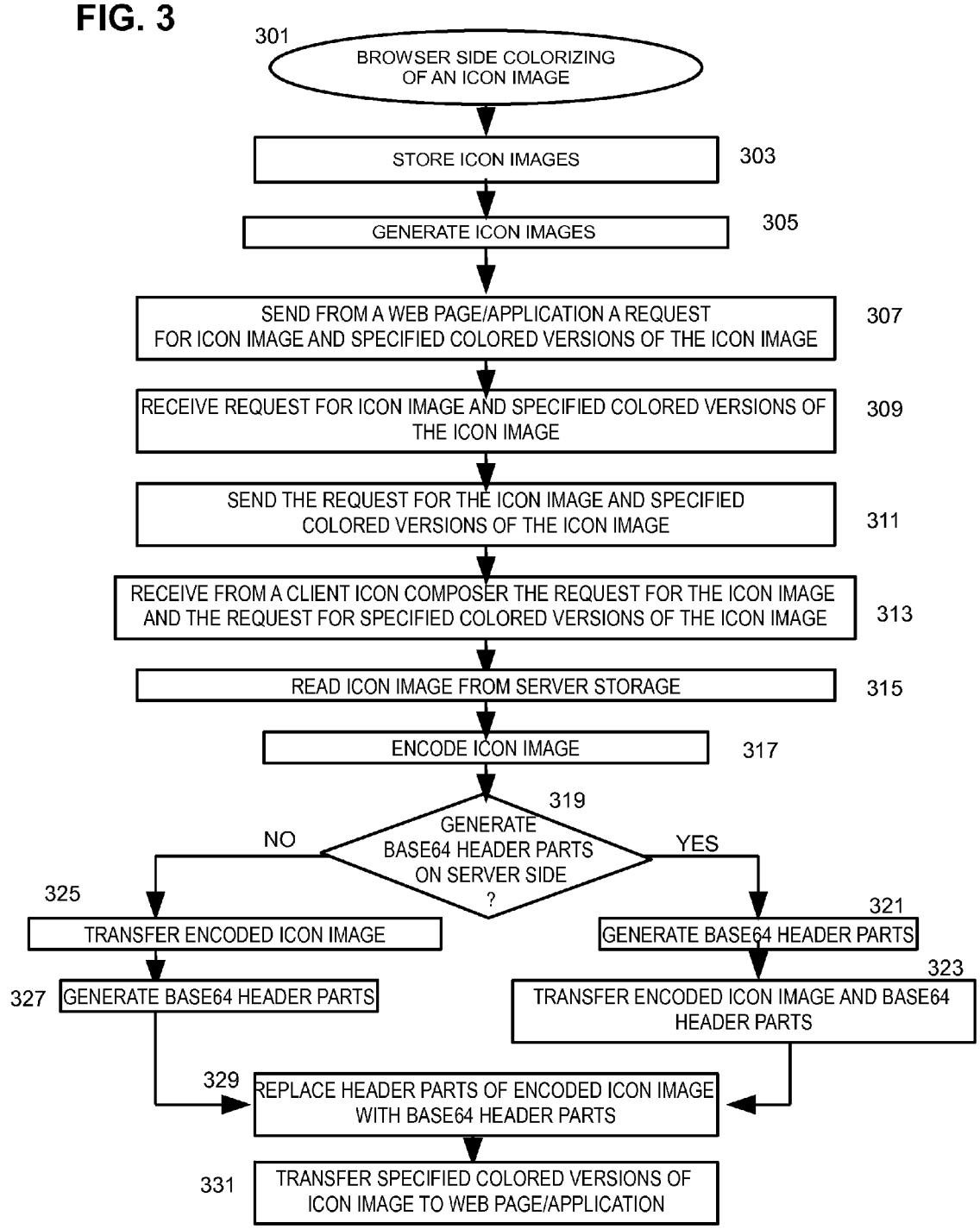
FIG. 3 is a flow chart illustrating an example of a procedure for browser side colorization of an icon image.

Referring now to FIG. 3, a flow chart illustrating an example of a procedure 301 for browser side colorization of an icon image will be discussed and described. The procedure 301 can advantageously be implemented on, for example, a processor of a controller, described in connection with FIG. 2, or other apparatus appropriately arranged.

The procedure 301 for browser side colorization of an icon image can store 303 icon images and generate 305 icon images by reading the icon images from the server storage, transforming the icon images into a color indexed image format, and storing the transformed icon images back into the server storage. This can be accomplished in advance or during runtime. The procedure 301 will send 307 from a web page/application a request for an icon image ad specified colored versions of the icon image.

A browser side component (such as the client icon composer) receives 309 the request for the icon image along with the request for the specified colored version of the icon image. That same browser side component can then send 311 the request for the icon image and the specified colored version of the icon image to a server side component (such as the data provider).

The procedure 301 will then have a server side component (such as the data provider) receive 313 the requests, read 315 the icon image, and then encode 317 the icon image into a Base64 character sequence. The Base64 character sequence may comprise two parts, a header part and an image data part. The header part has a fixed character length. The image data part may be fixed or have a variable length.

The procedure 301 makes 319 a determination regarding whether the Base64 header parts will be generated on the server side. If so then, the Base64 header parts are generated 321, for example on the server side by a component, such as a data provider. The procedure 301 then transfers 323 the encoded icon image and the Base64 header parts to a component, for example the client icon composer, which may be on the client/browser side.

If it is determined 319 that the generation of the Base64 header parts will occur on the client/browser side, then the procedure 301 transfers 325 the encoded icon image to a component such as the client icon composer, and the procedure 301 then generates 327 the Base64 header parts.

After generating the Base64 header parts, the procedure 301 replaces 329 the header parts of the encoded icon image with the Base64 header parts for the specified colored versions of the icon image. The procedure 301 then transfers 331 the specified colored versions of the icon image to the web page/application.

Figure 4:
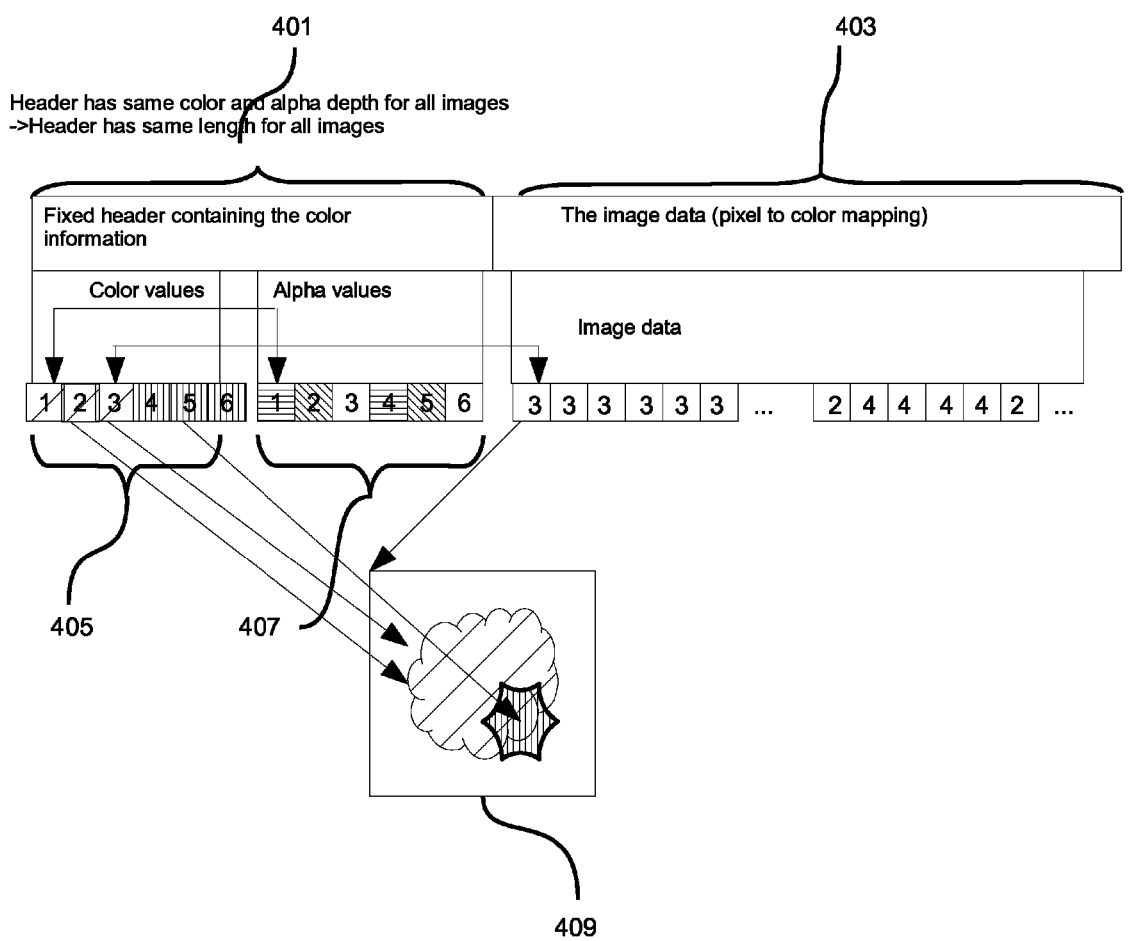
FIG. 4 is a diagram illustrating the base structure of a Base64 character string.

Referring now to FIG. 4, a diagram illustrating the base structure of a Base64 character string will be discussed and described. FIG. 4 identifies the different sections of a Base64 character string. A Base64 character structure includes a fixed character length header 401 and a variable character length image data 403. The fixed character length header 401 contains the color information such as color values 405 and alpha values 407. In some embodiments. The variable character length image data (pixel to color mapping) 403 defines the different color sections of the encoded icon image 409.

The header 401 encodes the header of the color palette based on the icon image. The header 401 contains the color and the alpha information of the image. Due to the special generated color palette based format and the equal image size, the length of the header can be the same for all encoded files generated and stored in this embodiment.

The image data 403 contains the encoded image data of the color palette based file. For the special generated color palette based file, this data represents a sequence of references to color palette entries. Accordingly, every pixel of the image is described by a reference to a color table entry contained in the header.

All of the files generated by this embodiment have color and transparency palettes of the same length, which leads to headers of the same length for all generated files. While the Base64 encoded header can be the same exact length for all encoded files, the image data can have a value range that is the same for all encoded files.

This special structure detailed in FIG. 4 enables the header 401 to be easily replaced by another header with color and transparency palettes of the same length, while the image data 403 remains. Replacing the header 401 by an encoded version containing a different color palette leads to the same icon with different colors.

Figure 5:
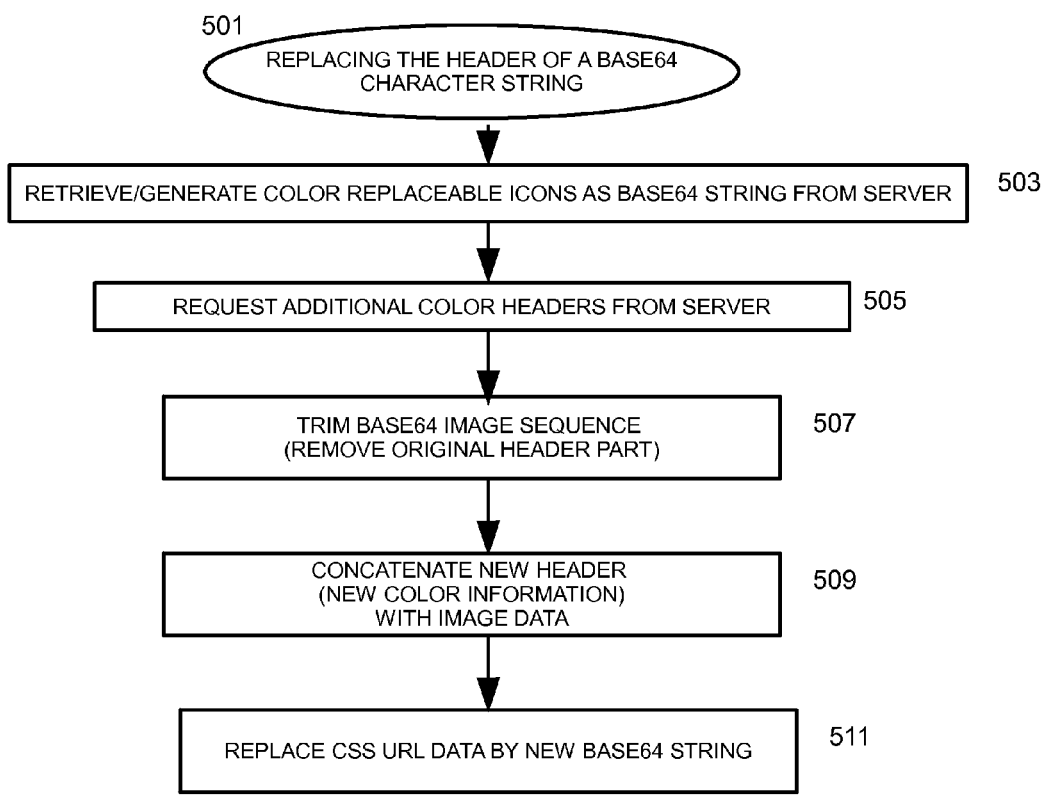
FIG. 5 is a flow chart illustrating an example of a procedure for creating colored versions of an icon image on the browser side by replacing the header of a Base64 character string.

Referring now to FIG. 5, a flow chart illustrating an example of a procedure for creating colored versions of an icon image on the browser side by replacing the header of a Base64 character string, will be discussed and described. The procedure 501 can advantageously be implemented on, for example, a processor of a controller, described in connection with FIG. 2, or other apparatus appropriately arranged. FIG. 5 illustrates how different colored versions of the icon image are created by header replacement. In the procedure 501 for replacing the header of a Base64 character string, a color replaceable icon encoded as a Base64 character string is retrieved 503 from the server. Then, the procedure 501 requests 505 additional color headers from the server. The procedure 501 trims 507 the Base64 image sequence so that the original header part is removed. The procedure 501 then concatenates 509 the new header with the image data. Accordingly, new color information replaces the old color information of the header. The procedure 501 replaces 511 the CSS URL data with the new Base64 string.

The procedure 501 illustrated in FIG. 5 occurs on the browser/client side.

Figure 6:
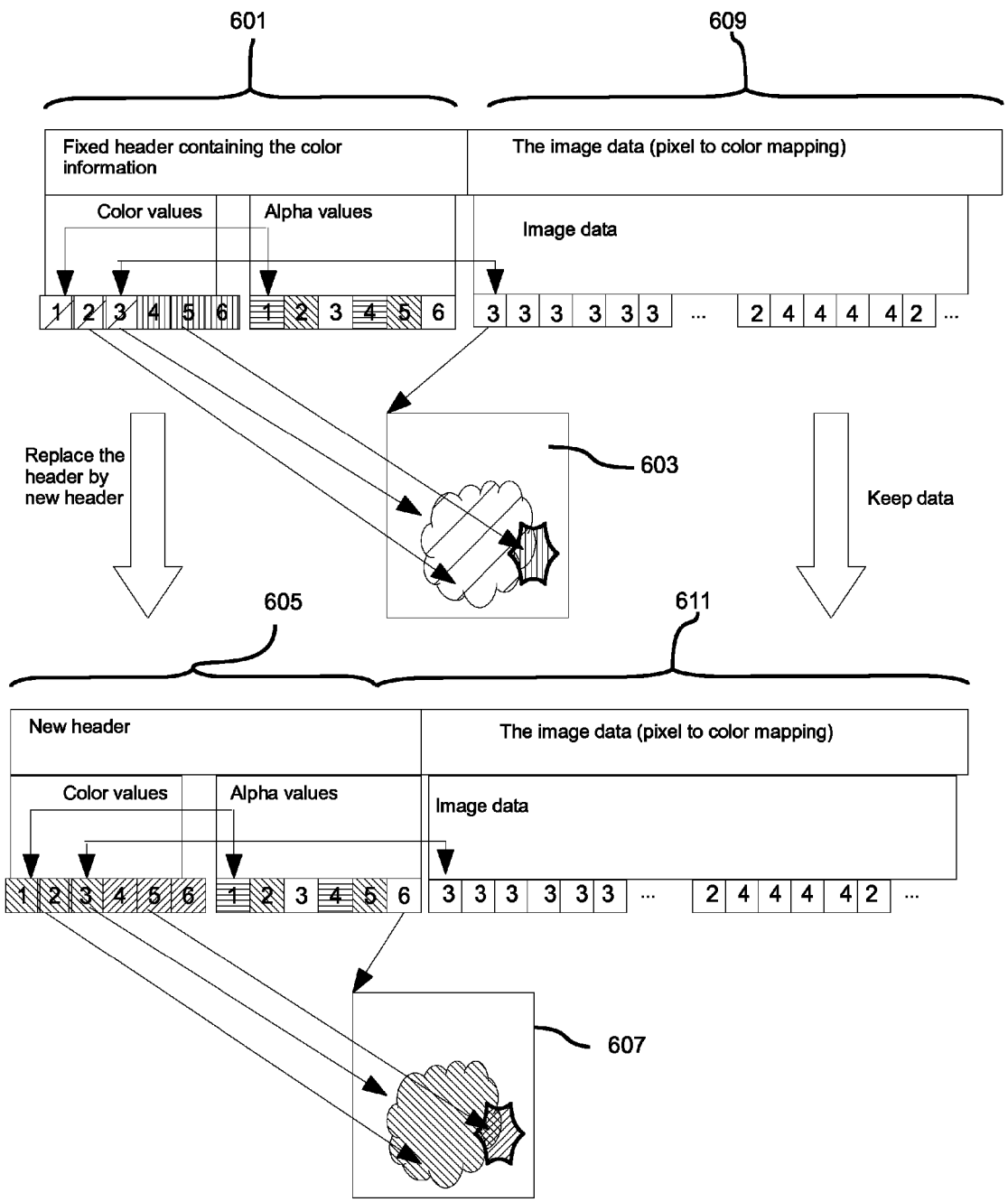
FIG. 6 is a diagram illustrating the replacement of the header of a Base64 character string.

Referring now to FIG. 6, a diagram illustrating the replacement of the header of a Base64 character string will be discussed and described. FIG. 6 further exemplifies how replacement of an original header 601 with a new header 605 changes the color of the icon image 603 to an icon image with the same icon in the different colors of the new header 605. The image data 609, 611 (pixel to color mapping) does not change from the image data 609 with the original header 601, to the image data 611 with the new header 605.

Figure 7:
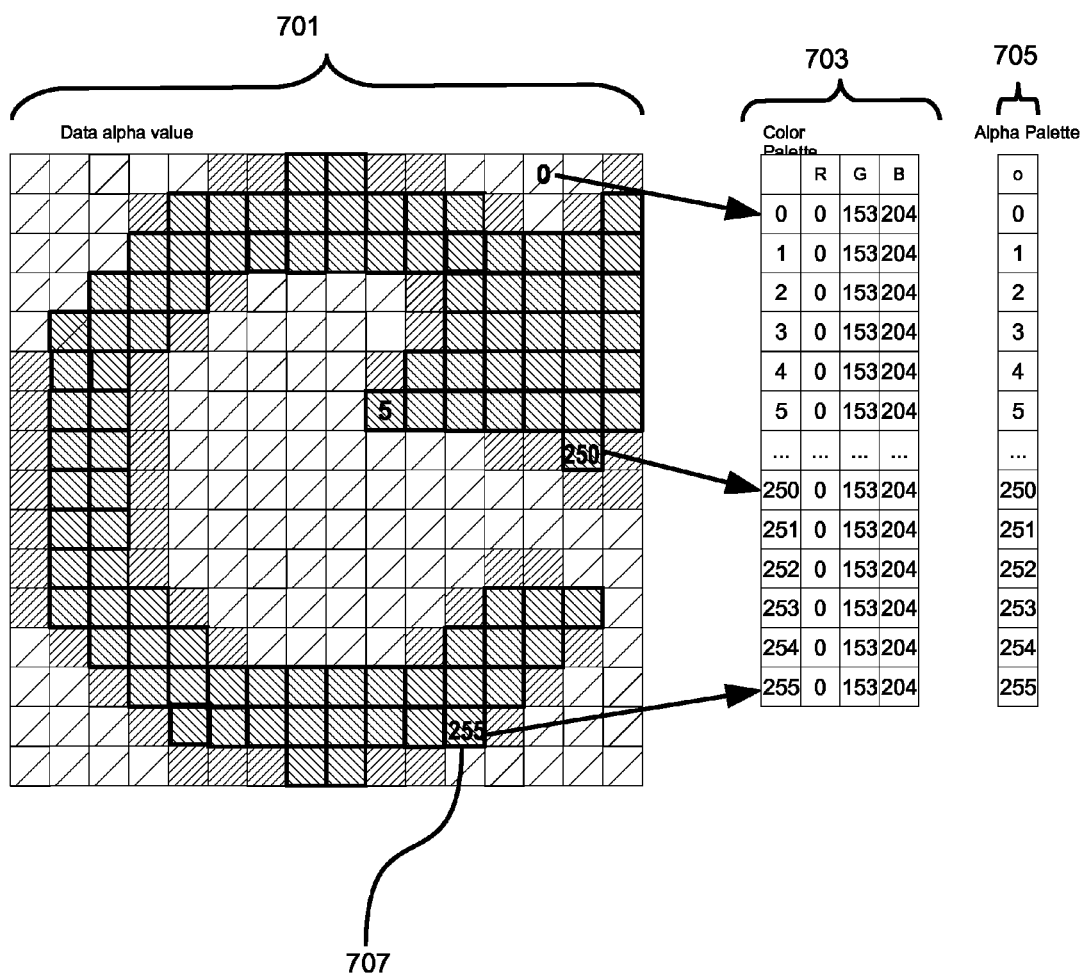
FIG. 7 is a diagram illustrating the encoding of a monochromatic icon image.

Referring now to FIG. 7, a diagram illustrating the encoding of a monochromatic icon image will be discussed and described. The relationship between an data alpha value 701, a color palette 703, and an alpha palette 705 is illustrated in FIG. 7, which is an example of an encoded monochrome icon image. The header includes the color palette 703, and the alpha palette 705. The image data is graphically represented in FIG. 7 as the data alpha value 701.

A monochrome icon image using transparency to describe the different color shades appearing in the image contains only one color. A transparency palette contains a series of one-byte alpha values, corresponding to the entries in the color palette. Accordingly, the logical color depth matches to logical alpha depth. A color value for each alpha value is needed even if the icon contains only one color. In this monochrome example, all colors of the palette will have the same value, but different alpha values described by the transparency palette.

In general the following steps describe the creation of the index PNG image header as a concrete example which fulfills the above discussion. However, other examples are possible, and indeed need not be limited to PNG images.

First, create an image header (IHDR chunk) using known techniques describing the attributes for all images (e.g. width and height). The color type for the PNG file is set to "Indexed-color" in accordance with known techniques.

Second, create a PNG color palette (PLTE chunk) for an alpha depth of 8-bit. Accordingly, 256 entries are defining the same color, which is the color of the monochrome image icon. This can be performed using known techniques.

Third, create a transparency palette (tRNS chunk) containing all alpha values for the 8-bit alpha depth. The alpha values are from 0 to 255. This can be performed using known techniques.

The header in FIG. 7, which includes the color palette 703, and the alpha palette 705, allows an image icon to be described with the logical color depth 1 (a monochrome image) and alpha depth of 256. Each entry in the color palette 703 describes an icon color with a different alpha value. For example, entry 0 in the color palette 703 describes an icon color (R=0, G=153, B=204) with a corresponding value for entry 0 in the alpha palette 705 of "0"; entry 1 in the color palette 703 describes an icon color (R=0, G=153, B=204) with a corresponding value for entry 1 in the alpha palette 705 of "1"; and so on. Thus, entries 0 to 255 in the color palette 703 are monochrome, that is, they all have the same RGB values, but entries 0 to 255 in the alpha palette 705 have different transparencies, that is, they have alpha values of 0-255 respectively.

The header can very easily be isolated within the Base64 encoded version of the image if the length of the header (in bytes) is divisible by three. In this case the header is ending with a full character of the Base64 encoded string and can be replaced by simple string operations. Techniques are known for Base64 encoding of a string. This unique structure makes this embodiment highly efficient.

In a case where the header is not divisible by three, the textual data chunk of the PNG header can be used to add an additional byte so that the header becomes divisible by three.

While encoding the data of the image, each pixel is replaced by an index into the palette representing the alpha value of the corresponding pixel. In FIG. 7, for example, pixel 707 has index 255 into the color palette 703, which has an R value of 0, a G value of 153, and a B value of 204 and an alpha value of 255, thus defining the color of pixel 707.

An overview will now be provided of the inventor's observations regarding existing technologies, in connection with FIG. 8, FIG. 9, FIG. 10 and FIG. 11, which provide a background for the method and system herein.

Figure 8:
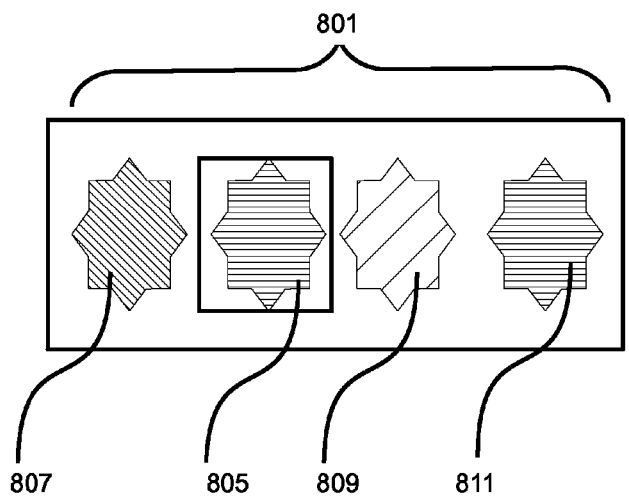
FIG. 8 is a diagram illustrating an image sprite.

Referring to FIG. 8, a diagram illustrating an image sprite will be discussed and described. In FIG. 8, there is a sprite image 801, which includes invisible parts of the image sprite 807, 809, 811, and a visible part of the image sprite 805. The image sprite 801 is a collection of the images 805, 807, 809, 811 put into a single image. With CSS it is possible to show just the part of a single image which is needed. In this illustration, the different images 805, 807, 809, 811 have different colors, shown in the drawing by hatching. Putting different colored versions of the same image into an image sprite 801 allows displaying different colored states of an icon at runtime. The main idea behind this approach is to provide an image for every colored state of the icon in one or more image sprites.

However, due to the multiple images, a larger amount of data must be sent to the browser. If the icon has four states (as illustrated here), the amount of data is four times as much as using a single image. Furthermore, the amount of different colored states cannot be changed at runtime.

The present system, however, can represent the sprite using a single image data and plural color headers. For the illustrated example, there can be a different color header which corresponds to each of the four states, and the single image data. Furthermore, one or more of the multiple color headers can be changed, deleted, or more color headers can be added, whether or not the application that uses the icon is running.

Figure 9:
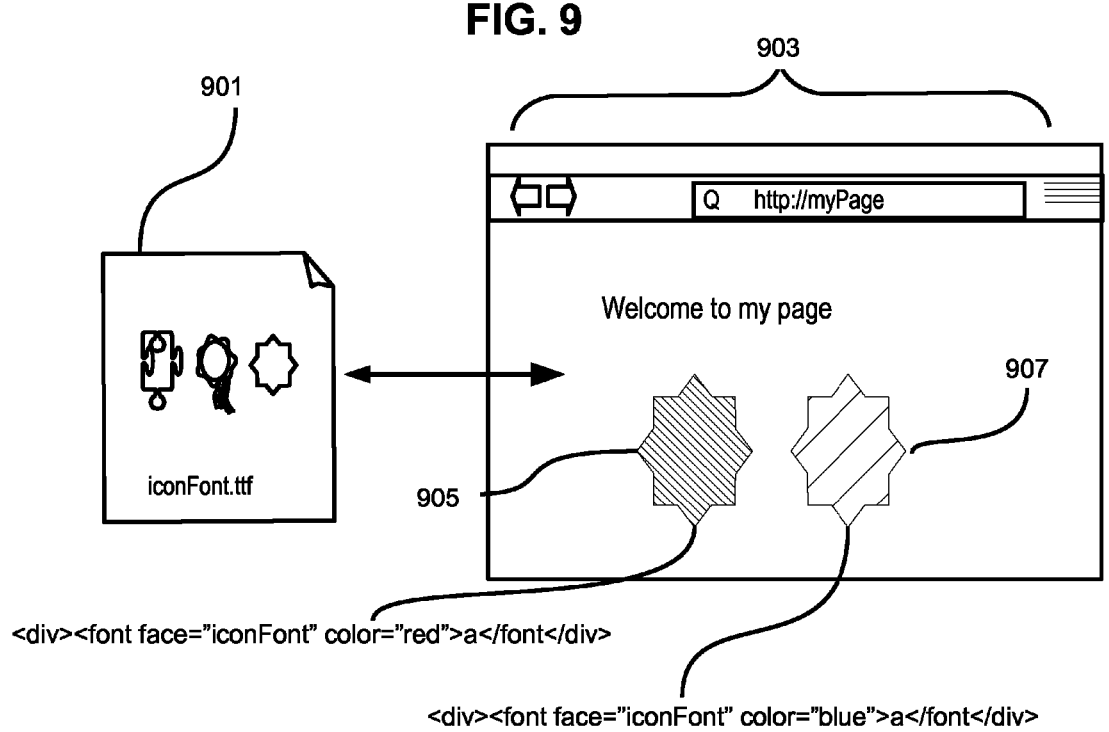
FIG. 9 is a diagram illustrating an icon font approach.

Referring now to FIG. 9, a diagram illustrating an icon font approach will be discussed and described. The idea behind this approach is to put scalable vector icons/images 905, 907 into a font file 901. The font file 901 is transferred to the browser and used like a font to display icons on the screen 903. Like all other fonts, the icon font allows the color and the size of the represented symbols to be changed. The color of the displayed font symbol can be changed to display different icon states; in FIG. 9, the color is changed in the <div> statement.

Unfortunately, for small icons with dimensions of 16×16px or 32×32px, which are common for web interfaces and web pages, the data of the vector based representation is around twice as much as a pixel based representation of the icon.

Furthermore, the vector based format does not allow a pixel perfect representation of different icons sizes. Unlike the pixel perfect representation of a raster image, the rendered result of a font depends on many factors of the client browser and cannot be predicted.

Font based representations of icons allows only the representation of monochrome icons. Consequently, it is not possible to display plural colors in a single icon.

The present system, however, can represent the pixel perfect representation of the image in the image data, and the color can easily be changed by providing multiple color headers. Furthermore, because the present system uses an indexed color palette, the image can be displayed simultaneously in multiple colors and in a gradient monochrome color scheme which are not possible in the icon font approach.

Figure 10:
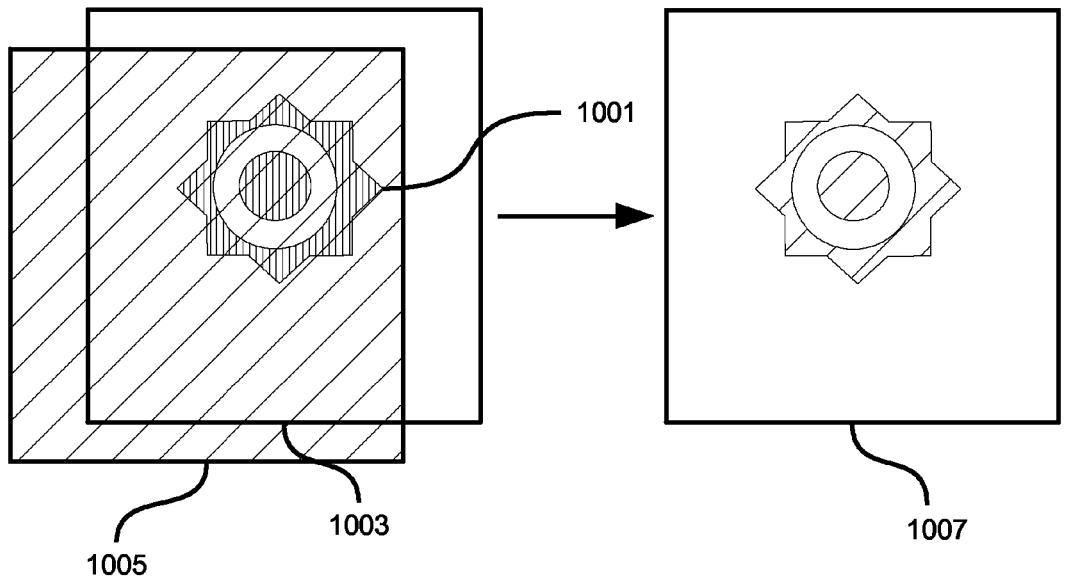
FIG. 10 is a diagram illustrating a CSS mask-image approach.

Referring now to FIG. 10, a diagram illustrating a CSS mask-image approach will be discussed and described. A new but rarely used approach is the usage of CSS3 image masks to create a colorable icon. Illustrated in FIG. 10 is an alpha mask 1003 used for a background, which describes visible parts 1001 and invisible parts of the background 1003; a colored background 1005 in which color is represented by diagonal hatching; and a resulting colored icon 1007. The colored background 1005 can be changed to change the color of the resulting colored icon 1007.

Unfortunately, few of the modern browsers support the CSS image-mask attribute. For example, the image-mask attribute is not supported in common browsers such as Microsoft Internet Explorer 9.0 or 10.0.

Furthermore, this approach allows the representation of only monochrome image icons. Also, changing color will require transferring new data of the colored background 1005.

The present system can achieve the same effect, however, by providing the icon as a single image data, and the colors of different masks as plural color headers. For the illustrated example, there can be a color header which corresponds to the color of the colored background 1005, and the single image data for the icon. Furthermore, plural different color headers can be provided, which can be changed, deleted, or more color headers can be added.

Figure 11:
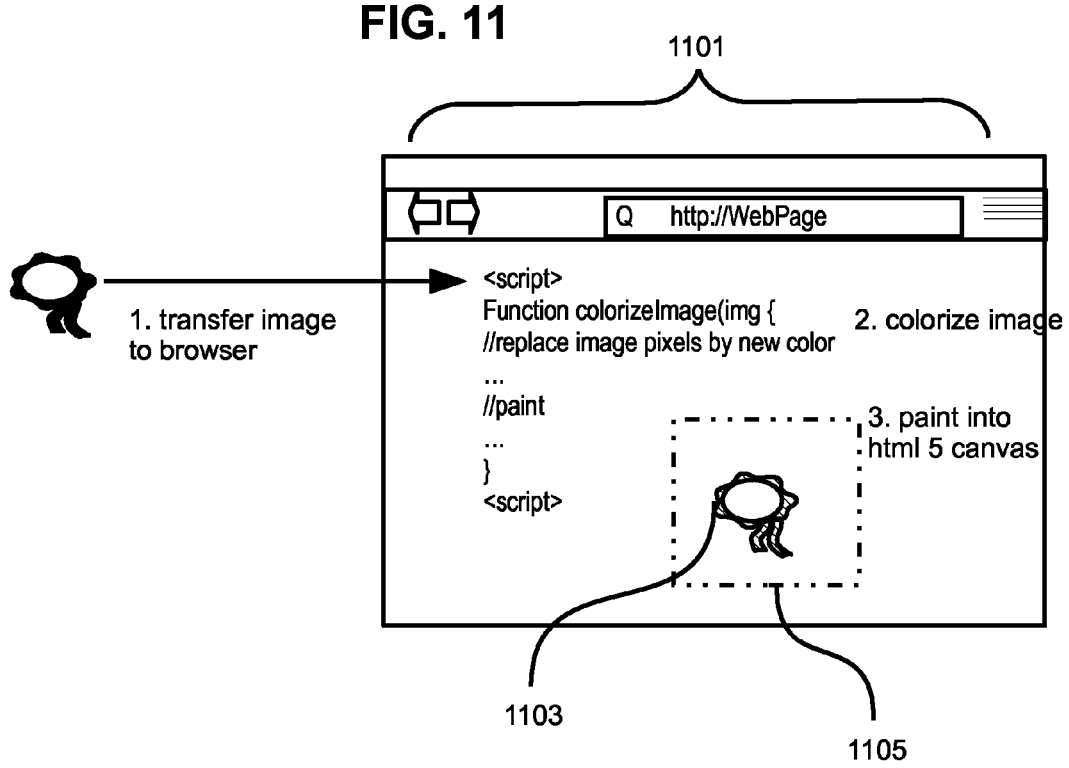
FIG. 11 is a diagram illustrating an HTML canvas approach.

Referring now to FIG. 11, a diagram illustrating an HTML canvas approach will be discussed and described. The idea behind the HTML 5 canvas approach is to have a script on a web page 1101 draw an icon 1103 into an HTML 5 canvas 1103 API. With the HTML Canvas API it is possible to draw a symbol into the web browser. With common pixel based color replacing graphic operations, a colored version of the icon is painted into the canvas.

The most common browser today already support the HTML 5 canvas and GPU (Graphics Processor Unit) acceleration. Unfortunately, pixel based operations for images are still time consuming and require additional processing power.

Furthermore, the HTML 5 canvas is not support by common browser like the Microsoft Internet Explorer 8.0.

The present system, however, can represent the icon using a single image data and plural color headers. For the illustrated example, the image is colorized by replacing the color header of the icon, instead of replacing individual image pixels with the new color.

As can be seen from FIG. 8 to FIG. 11, other approaches deal with the problem by sending multiple images, CSS transparencies or even HTML5 rendering. However, the approach presented herein can be simple and efficient. A base64-encoded image string containing the color palette as part of a header is modified. The header section containing the palette can be switched by a control on the client side, for example JavaScript or similar, according to the current UI component state. A palette generator on the server side can produce the appropriate palette headers that correspond to the state(s). This can permit modern applications to be rendered, whether in modern browser or older browser, without losing the interactive color-based state feedback.

The detailed descriptions, which appear herein, may be presented in terms of program procedures executed on a computer or a network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

Terms as used herein are intended to be interpreted as understood to one of skill in the art of user interfaces and computer images, instead of as interpreted by a more general dictionary.

Furthermore, the networks of interest for communicating between computers onto which some embodiments may be distributed include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof The invention is defined solely by the appended claims, as they may be amended during the pendency of this application for patent, and all equivalents thereof The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for browser side colorizing of a user interface (UI) component image, the method comprising:
providing, by a processor, a Base64-encoded image string having a header part and an encoded image,
the header part contains a color palette for a user interface (UI) component, and the header part with color values in the color palette is unitary and is separate from image data in the UI component,
the encoded image is the image data for the UI component, in a color indexed image format which indexes colors into the color palette in the header part;
providing, by the processor, for the header part, plural different color palettes corresponding respectively to plural different colored versions of the UI component,
wherein each of the plural different color palettes corresponds to a different state of the UI component; and
controlling, by the processor, responsive to a change in a current state of the UI component, the color of the UI component by replacing color values in content of the color palette in the header part of the Base64-encoded image string with one of the plural different color palettes which corresponds to a different colored version of the UI component, while the image data for the UI component remains unchanged,
wherein in the image string, the header part containing the color palette in which the content is replaced is a fixed length,
wherein the image data of the image string and the header part are concatenated.

2. The method of claim 1, wherein the UI component is an icon.

3. The method of claim 1, wherein the plural different color palettes corresponding to the plural different colored versions of the UI component are stored in a Base64-encoded format.

4. The method of claim 1, wherein the color palette of the header part is configured to include a transparency palette with a gradient monochrome color scheme.

5. The method of claim 1, wherein the replacing of the color palette in the header part of the Base64-encoded image string is performed while the UI component is displayed, causing the UI component which is being displayed to change to the different colored version of the UI component.

6. The method of claim 1, wherein the header part of the Base64-encoded image further comprises a transparency palette and the image data for the UI component indexes transparency for the image into the transparency palette in the header part, further comprising controlling, responsive to the change in the current state of the UI component, transparency of the UI component by replacing content of the transparency palette in the header part with one of plural different transparency palettes which corresponds to a different version of the UI component and the image data for the UI component remains unchanged.

7. A computer system for browser side colorizing of an user interface (UI) component image, the system comprising:
server storage that stores UI component images;
a server in communication with the server storage; and
a client, wherein
the server comprises:
an image generator configured to read the UI component images from server storage, transform the UI component images into a color indexed image format, and store the UI component images in the color indexed image format back into the server storage; and
a data provider;
the client comprises:
a web page/application configured to send a first request for the UI component image and specified colored versions of the UI component image, wherein each of the specified colored versions of the UI component image corresponds to a different state of the UI component; and
a client icon composer configured to receive from the web page/application the first request for the UI component image and specified colored versions of the UI component image; and that sends to the server a second request for the UI component image and specified colored versions of the UI component image;
the data provider is configured to:
receive the second request for the UI component image and specified colored versions of the UI component image from the client icon composer;
read the UI component image in the color indexed image format from the server storage;
encode the UI component image which is in the color indexed image format into a sequence which includes a header part and an image data part;
generate Base64 header parts of color palettes that correspond to the specified colored versions of the UI component image; and
transfer the encoded UI component image and the Base64 header parts for the specified colored versions of the UI component image to the client icon composer, wherein
the client icon composer is configured to:
receive the encoded UI component image and the Base64 header parts for the specified colored versions of the UI component image;
replace color values in the header part of the encoded UI component image with the Base64 header parts for the specified colored versions of the UI component image while the image data of the encoded UI component image remains unchanged, to control the color of the UI component; and
transfer the specified colored versions of the UI component image to the web page/application,
wherein
the control of the color of the UI component is performed responsive to a change in current state of the UI component,
in the encoded UI component image, the header part containing the color palette in which the color values is replaced is a fixed length, the image data of the encoded UI component image and the header part are concatenated.

8. The computer system of claim 7, wherein the Base64 header part of the UI component image further comprises a transparency palette and the image data of the encoded UI component image indexes transparency for the image into the transparency palette in the header part, wherein
control of the transparency of the UI component is performed responsive to a change in the current state of the UI component.

9. The computer system of claim 7, wherein
the UI component is an icon.

10. The computer system of claim 7, wherein replacing a Base64 header part of the encoded UI component image with a different Base64 header part creates a same UI component image with different colors specified in the different Base64 header part.

11. The computer system of claim 7, wherein a multi-colored UI component is colorized as indexed by data of the UI component image into the Base64 header part.

12. The computer system of claim 7, wherein a monochrome UI component is gradient colorized as indexed by data of the UI component image into the Base64 header part.

13. The computer system of claim 7, wherein the header part contains color information and alpha information of the encoded UI component image.

14. The computer system of claim 13, wherein the color information in the header part is the same character length for plural encoded UI component images generated by the computer system.

15. The computer system of claim 13, wherein the alpha information in the header part is the same character length for plural encoded UI component images generated by the computer system.

16. The computer system of claim 7, wherein the data provider determines whether the requested UI component image is in the server storage, and the data provider instructs the image generator to generate a corresponding UI component image when the requested UI component image is determined to not be in the server storage.

17. The computer system of claim 7, wherein the client icon composer generates the Base64 header parts for the specified colored versions of the UI component image.

18. A computer system for browser side colorizing of a UI component image, the system comprising a client, wherein
the client comprises:
a web page/application configured to send a first request for the UI component image and specified colored versions of the UI component image, wherein each of the specified colored versions of the UI component image corresponds to a different state of the UI component; and
a client icon composer configured to receive from the web page/application the first request for the UI component image and specified colored versions of the UI component image; and send a second request for the UI component image and specified colored versions of the UI component image;
the client icon composer is configured to:
receive an encoded UI component image and Base64 header parts for the specified colored versions of the UI component image;
replace color values in a header part of the encoded UI component image with the Base64 header parts for the specified colored versions of the UI component image while image data of the encoded UI component image remains unchanged, to control the color of the UI component; and transfer the specified colored versions of the UI component image to the web page/application, wherein the control of the color of the UI component is performed responsive to a change in current state of the UI component wherein in the encoded UI component image, the header part for the specified color versions in which content is replaced is a fixed length, wherein the image data of the encoded UI component image and the header part are concatenated.

19. The computer system of claim 18, wherein the UI component is an icon.

20. The computer system of claim 18, wherein the Base64 header part of the UI component image further comprises a transparency palette and the image data of the encoded UI component image indexes transparency for the image into the transparency palette in the header part, wherein control of the transparency of the UI component is performed responsive to a change in the current state of the UI component.

21. A computer system for browser side colorizing of a UI component image, the system comprising:

server storage that stores UI component images; and a server in communication with the server storage; wherein the server comprises:

an image generator configured to read the UI component images from the server storage, transform the UI component images into a color indexed image format, and store the transformed UI component images back into the server storage; and a data provider;

the data provider is configured to:

receive a request for the UI component image and a request for specified colored versions of the UI component image, wherein each of the specified colored versions of the UI component image corresponds to a different state of the UI component;

read the UI component image from the server storage;

encode the UI component image into a Base64 character sequence which includes a header part and an image data part;

generate Base64 header parts which have color values for different states of the specified colored versions of the UI component image; and transfer the encoded UI component image and the Base64 header parts for the specified colored versions of the UI component image, wherein requests which are received for the same UI component image with different requests of the specified colored versions result in transferring different Base64 header parts with the same UI component image, color palettes in the different Base64 header parts having different color values for the same states of the same UI component image, wherein in the Base64 character sequences, the header parts containing the color palette having the different color values for the same states of the same UI component image are a fixed length, wherein the image data of the image string and the header part are concatenated.

* * * * *